3,367,898
PROCESS FOR THE PROTECTION OF ARTICLES
AND COMPOSITIONS THEREFOR
Eugene L. Cadmus, Glen Ridge, N.J., assignor to Wood
  Ridge Chemical Corporation, Wood-Ridge, N.J., a corporation of Nevada
No Drawing. Filed Mar. 1, 1965, Ser. No. 436,322
10 Claims. (Cl. 260—29.6)

This invention relates to the protection of articles from fungus attack and mildew. More particularly, this invention relates to a process for the protection of articles from fungus attack and mildew and compositions therefor wherein the resistance to fungus attack is built into the polymer portion of the composition.

Polymer compositions and particularly vinyl acetate and acrylic emulsion compositions, e.g. water based polyvinyl acetate and acrylic emulsion paints are subject to attack by various fungi often resulting in mildew and deterioration of the composition. Fungi readily attack the organic materials in the compositions, particularly emulsifiers, wetting agents and the like. It is now the practice to utilize various additives, among them phenylmercuric acetate, oleate, salicylate and the like as a preservative to resist the growth of microorganisms on the painted surface and on the dirt which may accumulate on the surface. Moreover, paint compositions are particularly susceptible to fungus attack during storage and preservatives such as those described above must often be added in relatively large quantities to prevent such attack. However, many preservatives and particularly mercury compounds are strong flocculating agents whose use often result in the breaking down of the dispersion. This disadvantage in the use of mercury containing preservatives prevent their extensive use, particularly in the large amounts required in humid areas where fungus attack and mildew is a serious problem. Moreover, preservative additives often leach out or are weathered out of the coating. Thus there is a need for a means of providing effective resistance to fungus attack and mildew in polymeric compositions, particularly vinyl acetate and acrylic emulsion paint compositions without the use of preservative additives.

Therefore, it is one object of the invention to provide a process and compositions for the protection of articles from fungus attack and mildew.

Another object of this invention is to provide a process and compositions for the protection of articles from fungus attack and mildew in which the coated composition utilized inherently and permanently contains means for resisting fungus attack and mildew.

Still another object of this invention is to provide a process and paint composition therefor in which the resistance to attack from fungi is built into the polymer portion of the paint composition and which cannot leach out or be weathered out of coatings therefrom.

It has now been discovered that fungus attack and mildew in polymeric paint compositions can be effectively controlled by the use of a copolymer of a monomer selected from the group consisting of phenyl mercuric acrylate and phenyl mercuric methacrylate and either vinyl acetate or an acrylate or both in the form of an emulsion in place of the polyvinyl acetate and acrylic emulsions in conventional paint formulations. Thus the process of the present invention for the protection of articles from fungus attack and mildew comprises applying to the article to be protected a fungicidal composition comprising a copolymer, and preferably an emulsion of the copolymer, of a monomer selected from the group consisting of phenyl mercuric acrylate and phenyl mercuric methacrylate and a second monomer selected from the group consisting of vinyl acetate, methyl acrylate, ethyl acrylate, methyl methacrylate, ethyl methacrylate and mixtures thereof. Preferably the process of the present invention comprises applying to the article to be protected a fungus and mildew resistant aqueous emulsion paint composition comprising pigment, pigment extender, and in a quantity which is toxic to fungi, an emulsion comprising a copolymer of a monomer selected from the group consisting of phenyl mercuric acrylate and phenyl mercuric methacrylate and a second monomer selected from the group consisting of vinyl acetate, methyl acrylate, ethyl acrylate, methyl methacrylate, ethylmethacrylate, and mixtures thereof; surface active agent and water.

The phenyl mercuric acrylate and methacrylate monomers utilized in the compositions of the present invention can be prepared readily by treating phenyl mercuric hydroxide with acrylic and methacrylic acetate, respectively. For example, a solution of acrylic acid in a suitable solvent, such as methanol or ethanol can be added to an equimolar amount or slight excess thereof of phenylmercuric hydroxide dissolved in the same or different solvent. Alternatively, the acid, hydroxide and solvent can simply be added together. The reaction mixture is agitated for about one hour either at room temperature or at higher temperatures. The product can be precipitated from the solution by the addition of water, or the solvent can be distilled in vacuo and the phenyl mercuric acrylate extracted with n-hexane and crystallized therefrom. The product can be used as such or can be recrystallized from n-hexane. Phenyl mercuric methacrylate can be prepared in the same manner by substituting methacrylic acid for acrylic acid.

The copolymers of phenyl mercuric acrylate or phenyl mercuric methacrylate, and vinyl acetate and/or one or more of the acrylates is preferably utilized in the form of an emulsion. It is preferred that the emulsion be prepared in situ during polymerization by the use of emulsion polymerization. For example, the emulsion can be prepared in the following manner: A coalescing aid or protective colloid, such as hydroxy ethyl cellulose, an emulsion stabilizer such as a salt of an aromatic sulfonic acid and emulsifiers and dispersing agents are mixed with water. The mixture is heated, a polymerization catalyst, such as ammonium persulfate, ammonium sulfate, potassium persulfate, and the like, added, and a mixture of phenyl mercuric acrylate or methacrylate and the second monomer added thereto. A catalytic amount of catalyst, such as from about 0.001 to about 2% based on the weight of the reaction mixture has been found to be satisfactory. The combined mixtures are heated gradually until the polymerization is completed. The reaction mixture is the desired emulsion.

It is preferred to utilize an emulsion containing from about 45 parts to about 60 parts by weight copolymer composed of from about 1 to about 10 percent by weight phenyl mercuric acrylate or methacrylate and from about 90 to about 99 percent by weight second monomer as described above, with from about 0.05 to about 5 parts by weight emulsifier, and from about 35 parts to about 55 parts by weight water. In addition an improved emulsion can be prepared by adding from about 0.5 part to about 10 parts by weight of a coalescing aid or protective colloid as described above. By utilizing the above proportions, the emulsion will desirably contain an effective amount of mercury, that is, from about 0.1% to about 2% by weight mercury.

The emulsifiers and wetting agents useful to form the aqueous emulsions are surface active materials of the cationic, anionic and nonionic types. Use of anionic and nonionic, emulsifiers and anionic-nonionic emulsifier pairs are preferred to obtain rapid emulsions of excellent stability. Typical examples of such surface-active materials are sodium stearate, morpholine oleate, sodium lauryl sulfate, sodium 2-ethylhexyl sulfate, sodium 2-ethylhexanol-1 sulfate, sodium 7-ethyl-2-methyl-undecanol-4 sulfate, sodium naphthalene sulfonate, sodium alkylnaphthalenesulfonate, sodium oleic acid sulfonate, sodium castor oil sulfonate, glycerol monostearate containing a soap (or a sodium fatty alcohol sulfate), polyoxyethylene fatty alcohol ethers, polyglycol fatty acid esters, polyoxyethylene modified fatty acid esters, polyoxyethylene-polyol fatty acid esters, polyoxypropylene fatty alcohol ethers, polyoxypropylene glycol fatty acid esters, polyoxypropylene modified fatty acid esters, polyoxypropylene-polyol fatty acid esters, polyol fatty acid monoesters, di- and higher polyhydric alcohol fatty acid esters, cholesterol and other fatty acid esters, lanolin, oxidized fatty oils, alkylated aryl polyether alcohols such as the condensation product of diamylphenol with ethylene oxide, and the like.

The vinyl acetate or acrylic emulsion paint compositions of the present invention can be prepared in the conventional manner. For example, a mixer or dissolver can be charged with water, part of the emulsion if needed, dispersing agents, antifoaming agents and other additives. Pigment extenders and pigments are added to the mixer and the materials thoroughly mixed and dispersed. The emulsion is then added and the composition thoroughly mixed at a slow rate of speed. The resulting composition is the paint composition of the present invention.

There are a number of various pigments and combinations of pigments which can be used in the paint compositions of the present invention. Among the suitable pigments are: titanium dioxide; lead chromate; lead chromate mixed with various amounts of leads sulfate; lampblack; copper phthalocyanine; copper phthalocyanine with hydrogen atoms replaced with chlorine atoms; "molybdate orange" composed of lead chromate, lead sulfate and lead molybdate; iron oxide; toluidine red; natural and synthetic iron oxide reds; chrome oxide; and the like. While almost any available water can be used in the present composition, it is preferred to utilize clear, potable water.

Pigment extenders useful in the compositions of the present invention are preferably selected from the group consisting of calcium carbonate, mica, talc, diatomaceous silicas, synthetic silicates and the like, and mixtures thereof. As heretofore stated, it is desirable that the paint composition contain one or more wetting agents, dispersing agents, protective colloids, defoaming agents, antifreeze agents and the like. Exemplary of these materials are tetrapotassium pyrophosphate, ethylene glycol, ditertiary acetylenic glycol, hydroxy ethyl cellulose, methyl cellulose, carboxy methyl cellulose, and mixture thereof.

The method of the present invention comprises applying the aforesaid paint composition to articles to be protected. In the most common method of applying the paint compositions the paint composition is brushed on to the surface of the article to be protected. Other methods of application will be readily recognized by those skilled in the art.

The following examples illustrate the preparation of the compositions of the present invention and their application. Although certain specified ingredients are used in these examples, the invention is not limited thereto, and other ingredients within the scope of the above description can be substituted therefor.

EXAMPLE 1

*Preparation of an emulsion of vinyl acetate, ethyl acrylate and phenyl mercuric acrylate*

Hydroxy ethyl cellulose (1.5 g.), a 75% solution of salts of aromatic sulfonic acid in water (1.1 g.), alkyl aryl polyether alcohol prepared from the reaction of t-octylphenol and ethylene oxide (2.7 g.), sodium salt of alkyl aryl polyether sulfonate (0.5 g.), sodium higher alkyl sulfate (0.5 g.), sodium bicarbonate (0.6 g.) and water (109 ml.) are added to a 300 ml. three-necked round bottom flask equipped with a mechanical stirrer, internal thermometer, condenser and dropping funnel. The mixture was heated at 80 C. for one hour and then cooled to 30 C. Ammonium persulfate (0.4 g.) and 10% of a mixture of vinyl acetate (87.1 g.), ethyl acrylate (45.5 g.) and phenyl mercuric acrylate (1.4 g.) were added to the flask. The contents were heated to reflux and the temperature of the mixture increased to 80°–82° C. as polymerization progressed. The remainder of the mixture of monomers was slowly added to the flask from the dropping funnel. The reaction mixture was slowly heated to about 95° C. and maintained at that temperature for one hour. Upon cooling the reaction mixture obtained was the desired emulsion containing 0.39% mercury.

The fungicidal activity of this emulsion was demonstrated by microbiological tests performed in the following manner:

Ten cc. portions of the emulsion were introduced into glass cylinders placed on freshly cast, sterile nutrient agar in Petri dishes. The dishes, including controls without the emulsion, were inoculated with a spore suspension of a mixed culture of *Aspergillus niger* and *Penicillium Sp.* The dishes were allowed to incubate for five days and the diameter of the zone of inhibition around the cylinders were measured. Three replicates were used. The results of this test are presented in the following table:

TABLE I

| | Diameter of Zone of Inhibition (mm.), Replicates | | | |
|---|---|---|---|---|
| | No. 1 | No. 2 | No. 3 | Average |
| Emulsion of Example 1 | 52 | 45 | 49 | 48.7 |
| Control | 0 | 0 | 0 | 0 |

EXAMPLE 2

*Preparation of an emulsion of ethyl acrylate-phenyl mercuric acrylate copolymer*

Ethyl acrylate (74 g.) which has been treated with sodium hydroxide to remove the inhibitor, and phenyl mercuric acrylate (0.75 g.) are added to the first mixture described in Example 1 after ammonium sulfate (0.4 g.) has been added. The mixture is heated to reflux and the temperature maintained at about 95° C. for about one hour. Upon cooling the reaction mixture is the desired emulsion (2A) of ethyl acrylate and phenyl mercuric acrylate copolymer.

An emulsion (2B) was prepared using the same ingredients in the same proportions, except the polymerization was a solution polymerization wherein benzoyl peroxide was utilized as the polymerization catalyst. This emulsion after filtering contained 0.162% mercury, and had the following solubility in ethyl acetate: 73.5 gms./liter at 25° C. The fungicidal activity of this emulsion was demonstrated by microbiological tests performed as described in Example 1. The results of this test are presented in Table II below:

TABLE II

| | Diameter of Zone of Inhibition (mm.), Average |
|---|---|
| Emulsion (2B) | 34.3 |
| Control | 0 |

EXAMPLE 3

*Preparation of an emulsion of vinyl acetate phenyl mercuric acrylate copolymer*

Hydroxy ethyl cellulose (10 g.), phenoxy polyoxyethylene ethanol (1 g.), potassium persulfate (1 g.), water (213 ml.) and vinyl acetate (12 g.) are added to a 1 liter three-necked, round bottomed flask equipped with a mechanical stirrer, internal thermometer, condenser, nitrogen inlet tube and dropping funnel. A mixture of vinyl acetate (363 g.) and phenyl mercuric acrylate (3.4 g.) is placed in the dropping funnel. Nitrogen gas is bubbled through the mixture which is stirred and heated to a temperature of 75° C. over a period of about 20 minutes. The mixture in the dropping funnel is slowly added to the flask over a period of about three hours during which time the temperature is maintained at 75–80° C. After the addition is completed the reaction mixture is heated up to about 85° C. over a period of about 25 minutes. The reaction mixture is cooled and the contents poured through a cheese cloth filter. The resulting product is the desired emulsion of vinyl acetate and phenyl mercuric acrylate copolymer.

EXAMPLE 4

*Preparation of an exterior acrylic emulsion paint*

The following ingredients in parts by weight are charged to a mixer:

| | |
|---|---:|
| Titanium dioxide | 200 |
| Talc | 185.5 |
| Tributyl phosphate | 9.0 |
| 10% aqueous solution of polyacrylic acid and dispersing agent [1] | 12.5 |

[1] "Tamol 731," marketed by Rohm and Haas Company.

The above ingredients are mixed to obtain a homogeneous mixture. Water (50.1 parts) and anti-foaming agent (5.3 parts) are added and the resulting mixture mixed for several minutes. The emulsion of Example 2 (635 parts, 40% solids) is added to the mixer and thoroughly mixed with the agitator being driven at a slow speed. The resulting composition is useful for application as a paint to articles of wood which are to be exposed to the elements. This composition is resistant to fungus attack and mildew both while being stored and after it is spread to a thin film and dried on the article.

EXAMPLE 5

*Preparation of exterior vinyl acetate emulsion paint*

The following materials in parts by weight are added to a mixer:

| | |
|---|---:|
| Water | 100 |
| Polyelectrolyte dispersing agent | 8.4 |
| Tetrapotassium pyrophosphate | 1.0 |
| Condensation product of t-octylphenol and ethylene oxide | 1.5 |
| Ethylene glycol | 2 |
| 3% aqueous methyl cellulose solution | 70 |

The above materials are mixed until a homogeneous mixture is obtained. Titanium dioxide (250 parts), talc (50 parts) and mica (30 parts) are added to the mixture and stirred for several minutes. Water (25 parts) and an antifoaming agent (1 part) are added to the mixture which is then stirred for about 5 minutes. A mixture of ethoxyethyl acetate (20 parts) and water (20 parts), 3% aqueous methyl cellulose solution (68.5 parts), ethylene glycol (40 parts) and the product of Example 3 (425 parts) are added to the mixer which is then stirred at a slow speed to obtain the desired paint composition. This composition is resistant to fungus attack during storage and is resistant to fungus attack and mildew upon application to articles as a thin film.

EXAMPLE 6

*Preparation of a vinyl acetate-acrylic-phenyl mercuric acrylate emulsion paint composition*

The following ingredients in parts by weight are added in the order listed to a high speed dissolver and mixed therein.

| | |
|---|---:|
| Propylene glycol | 25 |
| 1.25% aqueous hydroxy ethyl cellulose solution | 100 |
| Potassium tripolyphosphate | 2 |
| Alkyl aryl sulfonate wetting agent | 4 |
| Titanium dioxide | 150 |
| Calcined clay | 125 |
| Calcium carbonate | 125 |
| Water | 50 |
| Ditertiary acetylenic glycol in ethylene glycol solution | 2 |

The following ingredients are added to the above mixture in the order listed with the dissolver stirring at a low speed.

| | |
|---|---:|
| 1.25% aqueous hydroxy ethyl cellulose solution | 150 |
| Product of Example 1 | 170 |
| Ethoxyethyl acetate | 4 |
| Water and additional hydroxy ethyl cellulose solution as required | 212 |

The paint composition prepared above has excellent resistance to fungus attack and mildew both during storage and after application as a coating to a painted surface.

EXAMPLE 7

*Preparation of a vinyl acetate-acrylic-phenyl mercuric acrylate emulsion paint composition*

The following ingredients in parts by weight are added and dispersed to a high speed dissolver in the order listed:

| | |
|---|---:|
| 2% aqueous methyl cellulose solution | 100 |
| Propylene glycol | 30 |
| Potassium tripolyphosphate | 1 |
| Alkyl aryl sulfonate wetting agent | 6 |
| Potassium carbonate | 27 |
| Titanium dioxide | 225 |
| Clay | 25 |
| Diatomaceous silica | 25 |
| Ditertiary acetylenic in ethylene glycol solution | 2 |
| Water | 25 |

The following ingredients in parts by weight are added and slowly stirred into the above dispersion in the order listed:

| | |
|---|---:|
| Water | 50 |
| Butoxyethyl acetate | 5 |
| Emulsion of Example 1 | 414 |
| Water and additional methyl cellulose solution if needed | 153 |

This paint composition is useful for coating wooden surfaces particularly those exposed to the elements and is resistant to fungus attack both during storage and after application to the surface.

I claim:

1. A process for the protection of articles from fungus attack and mildew which comprises applying to the article to be protected a fungicidal composition comprising a fungicidally active copolymer of
   (1) a monomer selected from the group consisting of phenyl mercuric acrylate and phenyl mercuric methacrylate, and
   (2) a second monomer selected from the group consisting of vinyl acetate, methyl acrylate, ethyl acrylate, methyl methacrylate, and ethyl methacrylate.

2. A process for the protection of articles from fungus attack and mildew which comprises applying to the article to be protected a fungicidal composition comprising a fungicidally active copolymer of phenyl mercuric acrylate and ethyl acrylate.

3. A process for the protection of articles from fungus attack and mildew which comprises applying to the article to be protected a fungicidal composition comprising a fungicidally active copolymer of phenyl mercuric acrylate and methyl acrylate.

4. A process for the protection of articles from fungus attack and mildew which comprises applying to the article to be protected a fungicidal composition comprising a fungicidally active copolymer of phenyl mercuric acrylate and methyl methacrylate.

5. A process for the protection of articles from fungus attack and mildew which comprises applying to the article to be protected a fungicidal composition comprising a fungicidally active copolymer of phenyl mercuric methacrylate and ethyl acrylate.

6. A fungus and mildew resistant paint composition comprising
   (1) pigment,
   (2) pigment extender, and
   (3) an emulsion comprising
      (a) a fungicidally active copolymer of (1) a monomer selected from the group consisting of phenyl mercuric acrylate and phenyl mercuric methacrylate, and (2) a second monomer selected from the group consisting of vinyl acetate, methyl acrylate, ethyl acrylate, methyl methacrylate, ethyl methacrylate;
      (b) surface active agent, and
      (c) water.

7. A process for the protection of articles from fungus attack and mildew which comprises applying to the article to be protected a paint composition comprising pigment, pigment extender and, in a quantity which is toxic to fungi, an emulsion comprising
   (a) a fungicidally active copolymer of:
      (1) a monomer selected from the group consisting of phenyl mercuric acrylate and phenyl mercuric methacrylate and
      (2) a second monomer selected from the group consisting of vinyl acetate, methyl acrylate, ethylacrylate, methyl methacrylate and ethyl methacrylate,
   (b) surface active agent, and
   (c) water.

8. A fungus and mildew resistant paint composition comprising
   (1) pigment,
   (2) pigment extender selected from the group consisting of mica, talc, calcium carbonate and diatomaceous silica;
   (3) water; and
   (4) in a quantity which is toxic to fungi; an aqueous acrylic emulsion comprising
      (a) a fungicidally active copolymer of (I) a monomer selected from the group consisting of phenyl mercuric acrylate and phenyl mercuric methacrylate, and (II) a second monomer selected from the group consisting of vinyl acetate, methyl acrylate, ethyl acrylate, methyl methacrylate, ethyl methacrylate,
      (b) an emulsifier for the copolymer, and
      (c) water.

9. A fungus and mildew resistant paint composition comprising pigment, pigment extender and, in a quantity which is toxic to fungi, an emulsion comprising
   (a) a fungicidally active copolymer of:
      (1) from about 1 to about 10 percent by weight of a monomer selected rfom the group consisting of phenyl mercuric acrylate and phenyl mercuric methacrylate and
      (2) from about 90 to about 99 percent by weight of a second monomer selected from the group consisting of vinyl acetate, methyl acrylate, ethyl acrylate, methyl methacrylate and ethyl methacrylate,
   (b) surface active agent, and
   (c) water.

10. A fungus and mildew resistant paint composition comprising
    (1) pigment,
    (2) pigment extender selected from the group consisting of mica, talc, calcium carbonate and diatomaceous silica;
    (3) water; and
    (4) in a quantity which is toxic to fungi, an aqueous acrylic emulsion comprising
       (a) from about 45 to about 60 parts by weight of a fungicidally active copoymer of (I) from about 1 to about 10 percent by weight of a monomer selected from the group consisting of phenyl mercuric acrylate and phenyl mercuric methacrylate, and (II) from about 90 to about 99 percent by weight of a second monomer selected from the group consisting of vinyl acetate, methyl acrylate, ethyl acrylate, methyl methacrylate, ethyl methacrylate,
       (b) from about 0.05 to about 5 parts by weight of an emulsifier for the copolymer, and
       (c) from about 35 to about 55 parts by weight water.

References Cited

UNITED STATES PATENTS

| 3,150,110 | 9/1964 | Becker | 260—29.6 |
| 3,089,811 | 5/1963 | Pugh | 167—42 |

OTHER REFERENCES

Chemical Abstract, vol. 55, page 26522F (1961).

MURRAY TILLMAN, *Primary Examiner.*

J. L. WHITE, *Assistant Examiner.*